(12) United States Patent
Matsumoto et al.

(10) Patent No.: US 7,985,397 B2
(45) Date of Patent: Jul. 26, 2011

(54) METHOD OF TREATING HYDROGEN SULFIDE, METHOD OF PRODUCING HYDROGEN, AND PHOTOCATALYTIC-REACTION APPARATUS

(75) Inventors: Hiromichi Matsumoto, Tokyo (JP); Akira Kishimoto, Tokyo (JP); Kazuyuki Tohji, Sendai (JP)

(73) Assignees: Nittetsu Mining Co., Ltd., Tokyo (JP); Tohoku University, Sendai-shi (JP)

( * ) Notice: Subject to any disclaimer, the term of this patent is extended or adjusted under 35 U.S.C. 154(b) by 552 days.

(21) Appl. No.: 11/910,026

(22) PCT Filed: Mar. 29, 2006

(86) PCT No.: PCT/JP2006/306570
§ 371 (c)(1), (2), (4) Date: Sep. 28, 2007

(87) PCT Pub. No.: WO2006/106784
PCT Pub. Date: Oct. 12, 2006

(65) Prior Publication Data
US 2008/0245655 A1    Oct. 9, 2008

(30) Foreign Application Priority Data
Mar. 31, 2005 (JP) .................. 2005-101849

(51) Int. Cl.
*C01B 17/02* (2006.01)

(52) U.S. Cl. ............... 423/573.1; 423/576.2; 423/648.1; 205/464; 205/554; 205/617; 205/637

(58) Field of Classification Search ............... 423/573.1, 423/576.2, 648.1; 205/464, 554, 617, 637
See application file for complete search history.

(56) References Cited

U.S. PATENT DOCUMENTS

| 3,925,212 | A |   | 12/1975 | Tchernev |
|---|---|---|---|---|
| 4,094,751 | A | * | 6/1978 | Nozik ........................ 205/638 |
| 4,427,749 | A | * | 1/1984 | Graetzel et al. ............ 429/111 |
| 4,526,774 | A | * | 7/1985 | Maas et al. .............. 423/576.2 |
| 5,147,620 | A | * | 9/1992 | Rozsa ......................... 423/224 |
| 5,908,545 | A | * | 6/1999 | Donini et al. .............. 205/617 |

(Continued)

FOREIGN PATENT DOCUMENTS

JP           10-28837 A        2/1998

(Continued)

OTHER PUBLICATIONS

JP 2004-25032, Machine Translation from JPO website.*
Naman, S.A. et al. "Photocatalytic Production of Hydrogen from Hydrogen Sulfide in Ethanolamine aqueous solution containing semiconductors dispersion." Int. J. Hydrogen Energy, vol. 20, No. 4 pp. 303-307, 1995.*

(Continued)

*Primary Examiner* — Jessica L Ward
*Assistant Examiner* — Paul A Wartalowicz
(74) *Attorney, Agent, or Firm* — Sughrue Mion, PLLC

(57) ABSTRACT

A method of treating hydrogen sulfide or producing hydrogen which comprises disposing a liquid tank having a photocatalyst electrode comprising a photocatalyst and a liquid tank having a metal electrode so that the two liquid tanks are separated from each other by a cation-exchange membrane, placing a liquid containing either hydrogen sulfide or an organic substance in the liquid tank having the photocatalyst electrode, electrically connecting the photocatalyst electrode to the metal electrode, and exposing the photocatalyst to a light. The liquid to be placed in the liquid tank having the metal electrode preferably is an acidic solution. The photocatalyst preferably comprises a metal sulfide, and preferably is fine particles having a layered nanocapsule structure.

10 Claims, 6 Drawing Sheets

U.S. PATENT DOCUMENTS

2006/0196776 A1* 9/2006 Bockris .................. 205/617

FOREIGN PATENT DOCUMENTS

| JP | 2001-190964 A | 7/2001 |
|----|---------------|--------|
| JP | 2003-181297 A | 7/2003 |
| JP | 2004-25032 A  | 1/2004 |
| JP | 2004-256378 A | 9/2004 |
| NL | 8200897 A     | 10/1983 |

OTHER PUBLICATIONS

Milczarek, G. et al., Optimization of a two-compartment photoelectrochemical cell for solar hydrogen production, Int.J. Hydrgen Energy, Sep. 2003, vol. 28, No. 9, pp. 919-926.

* cited by examiner

METHOD OF TREATING HYDROGEN SULFIDE, METHOD OF PRODUCING HYDROGEN, AND PHOTOCATALYTIC-REACTION APPARATUS

TECHNICAL FIELD

The present invention relates to methods of using a photocatalyst which are utilizable in fields such as the field of chemical industry where hydrogen, sulfur, or the like is necessary, the field of chemical industry where hydrogen sulfide or the like generated in a desulfurization or another step is treated, and the field of environmental preservation where malodorous substances and atmospheric pollutants are removed.

BACKGROUND ART

Applications of photocatalyst techniques have come to be practically used while taking advantage of the property of accelerating various chemical reactions including the decomposition of environmental pollutants, malodorous components/various germs, etc. Examples thereof include antibacterial tiles for use in operating rooms in hospitals, filters for air cleaners and air conditioners, and glasses for, e.g., the lighting of expressways or the like. Besides such practical uses where the oxidation-accelerating ability of photocatalysts is utilized, investigations are being made for the purpose of causing a photocatalyst to act on water or the like to obtain hydrogen or to act on carbon dioxide to fix/reduce the carbon.

On the other hand, from the standpoints of the impoverishment of fossil energy resources and environmental issues such as air pollution caused by global warming, there is a desire for the establishment of a technique for obtaining a clean and safe energy and a cleaning technique for treating environmental pollutants. Of such techniques, use of a photocatalyst is promising. For example, application of a photocatalyst to the step of desulfurizing a crude oil or to a desulfurization step in metal refining may be promising.

The step of crude-oil desulfurization presently in general use is as follows. When a crude oil is distilled, the heavy naphtha is subjected to hydrofining, whereby all the sulfur ingredients contained in the crude oil are converted to hydrogen sulfide and recovered. This hydrogen sulfide is treated by the process called the Claus process and recovered through sulfur oxidation. The Claus process is a process in which one-third of the hydrogen sulfide is oxidized to sulfur dioxide and this sulfur dioxide is reacted with the remaining hydrogen sulfide to obtain elemental sulfur.

This process necessitates a huge amount of energy because heating and condensation are repeated besides the catalytic reaction of sulfur dioxide with hydrogen sulfide. It further has problems, for example, that the management of sulfur dioxide is costly. If a method which comprises adding a photocatalyst to an aqueous alkali solution containing hydrogen sulfide dissolved therein, irradiating the photocatalyst to a light to cause it to absorb the energy of the incident light and generate free electrons and free holes, and oxidizing/reducing the aqueous alkali solution containing dissolved hydrogen sulfide with the free electrons and free holes to obtain hydrogen and sulfur, i.e., a method in which hydrogen sulfide is decomposed with a photocatalyst to generate hydrogen and sulfur, can be put to practical use, then it becomes possible to decompose hydrogen sulfide, which is a hazardous substance, and produce hydrogen and sulfur, which are useful substances, using a smaller amount of energy. Namely, this contributes to the resolution of an environmental issue and enables the production of useful substances.

On the other hand, with respect to the generation of hydrogen by electrolysis, the process in which water is electrolyzed by means of the electromotive force of solar cells is being conducted. In this process, however, the efficiency of electrolysis is governed by the performance of the solar cells. There has hence been a problem that since the devices constituting high-performance solar cells are high-purity high-quality devices, such solar cells are expensive.

In this respect also, if a method in which water is decomposed with a photocatalyst to generate hydrogen can be put to practical use, it becomes possible to produce hydrogen with a smaller energy amount at a lower cost.

However, photocatalysts heretofore in use have had the following problems to be overcome. First, their catalytic activity is low. Secondly, the photocatalysts are toxic. Although photocatalysts generate free electrons and free holes upon irradiation with a light, it is highly probable that these free electrons and free holes recombine. Furthermore, there also is a high possibility that a chemical substance which has been decomposed by an oxidation/reduction reaction might undergo recombination and return to the original compound. Low catalytic activity hence results. Thirdly, the catalysts have a short life. Although the catalysts generate free electrons and free holes upon irradiation with a light, the catalysts themselves are oxidized/reduced, besides a target chemical substance, due to the strong oxidation/reduction reactions caused by the free electrons and holes. Namely, there is a problem of photodissolution that the catalysts thus dissolve away and lose their catalytic activity.

In order to overcome those problems, patent document 1 discloses a photocatalyst having high catalytic activity, no toxicity, and a long life. There is a statement therein to the effect that those three problems have been eliminated.

Also known is a method of treating hydrogen sulfide or method of producing hydrogen in which a stratified-structure electrode comprising a photocatalyst activated with a metal is used.

Patent Document 1: JP-A-2001-190964

DISCLOSURE OF THE INVENTION

Problems that the Invention is to Solve

However, the stratified-structure electrode has the following problem. The metal side is corroded by hydrogen sulfide or polysulfide ions ($S_2^{2-}$) are adsorbed onto the metal surface to form a sulfide. The electrode thus comes to have no metal surface part for forming hydrogen gas from hydrogen ions ($H^+$) and becomes incapable of generating hydrogen gas. That method employing the stratified-structure electrode has been still unsatisfactory with respect to efficiency.

Accordingly, an object of the invention is to eliminate the drawbacks of prior-art techniques described above and provide: a technique enabling highly efficient hydrogen sulfide decomposition and hydrogen generation with a photocatalyst; and apparatus for use in this technique.

Means for Solving the Problems

As a result of intensive investigations, the present inventors have succeeded in eliminating those problems by employing the following constitutions. Namely, the present invention is as follows.

(1) A method of treating hydrogen sulfide, which comprises disposing a liquid tank having a photocatalyst electrode comprising a photocatalyst and a liquid tank having a metal electrode so that the two liquid tanks are separated from each other by a cation-exchange membrane, placing a liquid containing hydrogen sulfide in the liquid tank having a photocatalyst electrode, electrically connecting the photocatalyst electrode to the metal electrode, and exposing the photocatalyst to a light.
(2) The method of treating hydrogen sulfide as described under (1) above, wherein the liquid to be placed in the liquid tank having a metal electrode is an acidic solution.
(3) The method of treating hydrogen sulfide as described under (1) above wherein the photocatalyst comprises a metal sulfide.
(4) The method of treating hydrogen sulfide as described under (1) above, wherein the photocatalyst is fine particles having a layered nanocapsule structure.
(5) The method of treating hydrogen sulfide as described under (1) above, wherein the liquid containing hydrogen sulfide is one obtained by bubbling hydrogen sulfide gas into an alkaline liquid to dissolve the gas in the liquid.
(6) The method of treating hydrogen sulfide as described under (5) above, wherein the hydrogen sulfide gas is one obtained by bubbling a gas containing hydrogen sulfide and carbon dioxide into a methyldiethanolamine solution, subsequently heating this methyldiethanolamine solution to a temperature higher than ordinary temperature, and bubbling air into the heated solution to cause the solution to release the hydrogen sulfide.
(7) A method of producing hydrogen, which comprises disposing a liquid tank having a photocatalyst electrode comprising a photocatalyst and a liquid tank having a metal electrode so that the two liquid tanks are separated from each other by a cation-exchange membrane, placing a liquid containing either hydrogen sulfide or an organic substance in the liquid tank having a photocatalyst electrode, electrically connecting the photocatalyst electrode to the metal electrode, and exposing the photocatalyst to a light.
(8) The method of producing hydrogen as described under (7) above, wherein the liquid to be placed in the liquid tank having a metal electrode is an acidic solution.
(9) The method of producing hydrogen as described under (7) above wherein the photocatalyst comprises a metal sulfide.
(10) The method of producing hydrogen as described under (7) above, wherein the photocatalyst is fine particles having a layered nanocapsule structure.
(11) The method of producing hydrogen as described under (7) above, wherein the liquid containing hydrogen sulfide is one obtained by bubbling hydrogen sulfide gas into an alkaline liquid to dissolve the gas in the liquid.
(12) The method of producing hydrogen as described under (11) above, wherein the hydrogen sulfide gas is one obtained by bubbling a gas containing hydrogen sulfide and carbon dioxide into a methyldiethanolamine solution, subsequently heating this methyldiethanolamine solution to a temperature higher than ordinary temperature, and bubbling air into the heated solution to cause the solution to release the hydrogen sulfide.
(13) A photocatalytic-reaction apparatus having a first liquid tank which has a photocatalyst electrode comprising a photocatalyst and in which a liquid containing hydrogen sulfide is to be placed and a second liquid tank having a metal electrode, the first liquid tank and the second liquid tank being separated from each other by a cation-exchange membrane, the photocatalyst electrode being electrically connected to the metal electrode, and the apparatus having been constituted so that the photocatalyst electrode is capable of being irradiated with a light.
(14) A photocatalytic-reaction apparatus having a first liquid tank for placing therein a liquid containing hydrogen sulfide and a second liquid tank disposed in the first liquid tank, wherein the second liquid tank has partition materials, part of which is constituted of a member comprising an electrically conductive plate, a photocatalyst layer formed on one side of the plate, and a metallic layer formed on the opposite side of the plate, the side having the photocatalyst layer and the side having the metallic layer facing outward and inward, respectively, and other part of the partition materials of the second liquid tank is constituted of a cation-exchange membrane, and the apparatus has been constituted so that the photocatalyst layer is capable of being irradiated with a light.
(15) The photocatalytic-reaction apparatus as described under (13) or (14) above, which has a device for supplying or circulating an acidic solution to the second liquid tank.

Advantage of the Invention

According to the invention, the direct decomposition of hydrogen sulfide on a photocatalyst electrode and the production of hydrogen on a metal electrode can be efficiently conducted with light energy such as, e.g., visible light.

Figure 1:
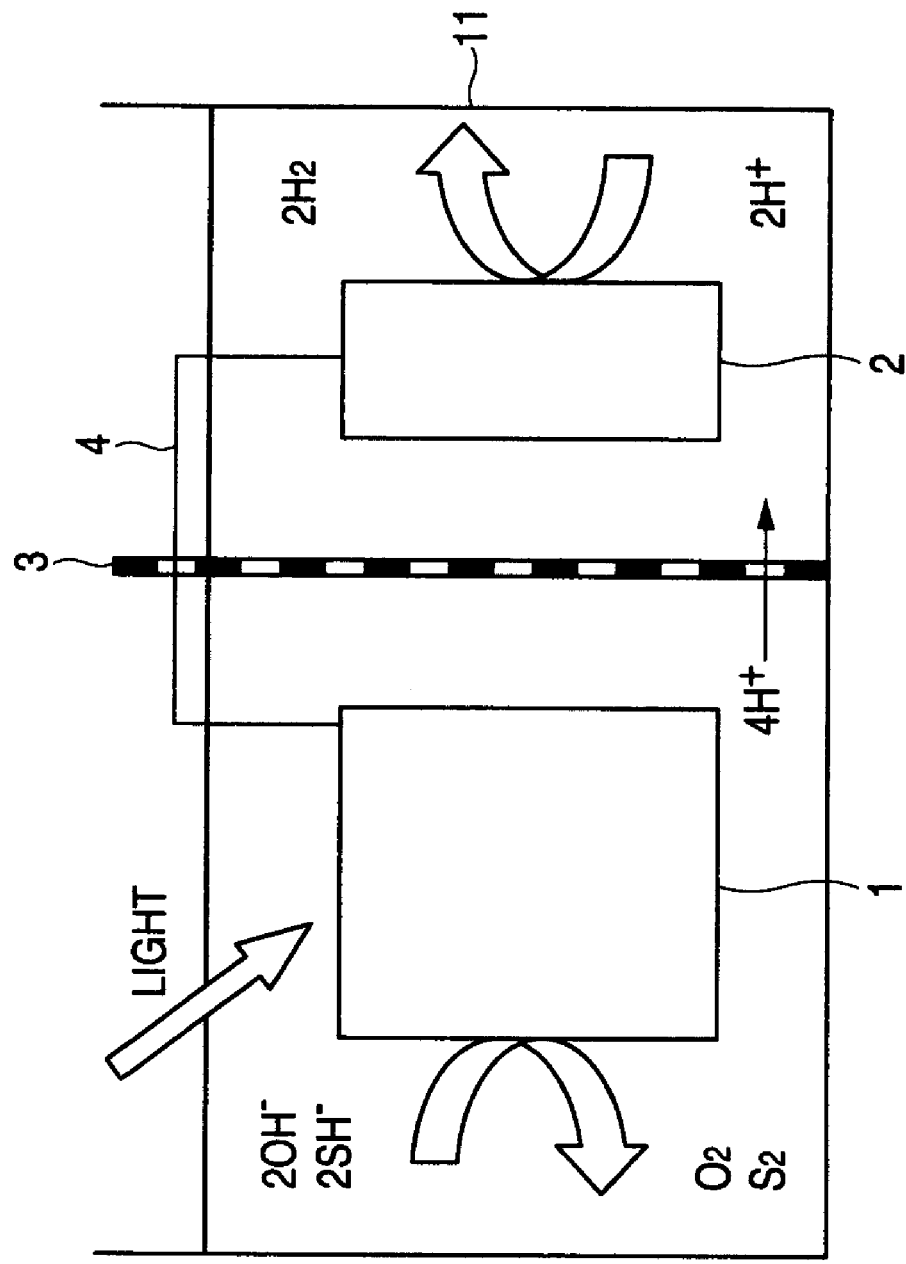
FIG. 1 is a diagrammatic view illustrating the principle of an apparatus for use in hydrogen sulfide treatment and hydrogen production as one embodiment of the invention.

DESCRIPTION OF THE REFERENCE NUMERALS 1 photocatalyst electrode
2 platinum electrode
3 cation-exchange membrane
4 lead wire
5 pipe made of acrylic resin
6 pipe made of transparent vinyl chloride resin
7 pipe made of rigid vinyl chloride resin
8 xenon lamp
11 cell for electrolysis
21 washing bottle
22 air pump 23 heater
24 cooler
31 photocatalyst layer
32 metallic layer
33 electrically conductive plate
34 photoelectrochemical cell

MODE FOR CARRYING OUT THE INVENTION

Embodiments of the invention will be explained below in detail by reference to the drawings. However, the invention should not be construed as being limited to the following embodiments.

In two drawings illustrating embodiments, constituent elements having the same function are indicated by the same reference numeral and a repetition of the explanation thereof is omitted.

FIG. 1 is a view diagrammatically illustrating one embodiment the apparatus of the invention for treating hydrogen sulfide and producing hydrogen.

The apparatus shown in FIG. 1 is operated on a basic principle in which the electrolysis of a raw liquid is conducted by means of the photoelectromotive force generated between a semiconductor photocatalyst electrode and a metal electrode. The constitution of the apparatus is explained first and effects thereof are explained next.

In FIG. 1, a cell 11 for electrolysis has been partitioned with a cation-exchange membrane 3. A photocatalyst electrode 1 and a metal electrode 2 have been disposed on the anode side (left side in FIG. 1) and the cathode side (right side in FIG. 1), respectively. This apparatus has been constituted so that the photocatalyst electrode 1 and the metal electrode 2 are electrically connected to each other with a lead wire 4 which is a conductive member.

In order to treat hydrogen sulfide and produce hydrogen using the electrolytic cell 11 having the constitution described above, a liquid containing hydrogen sulfide and other substances is electrolyzed with the photoelectromotive force generated between the photocatalyst electrode 1 and the metal electrode 2.

Hydrogen sulfide ions (HS⁻) present in the aqueous hydrogen sulfide solution are decomposed with light energy into hydrogen ions (H⁺) and polysulfide ions ($S_2^{2-}$) on the photocatalyst electrode 1. The electrons which generate upon the decomposition and the hydrogen ions move to the metal electrode through the conductive member (electrons) and the cation-exchange membrane (hydrogen ions), and the hydrogen ions are reduced on the metal electrode 2 to generate hydrogen gas.

Reaction formulae for these two steps are as follows.

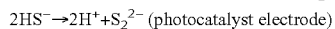
$2HS^- \rightarrow 2H^+ + S_2^{2-}$ (photocatalyst electrode)

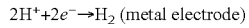
$2H^+ + 2e^- \rightarrow H_2$ (metal electrode)

Figure 6:
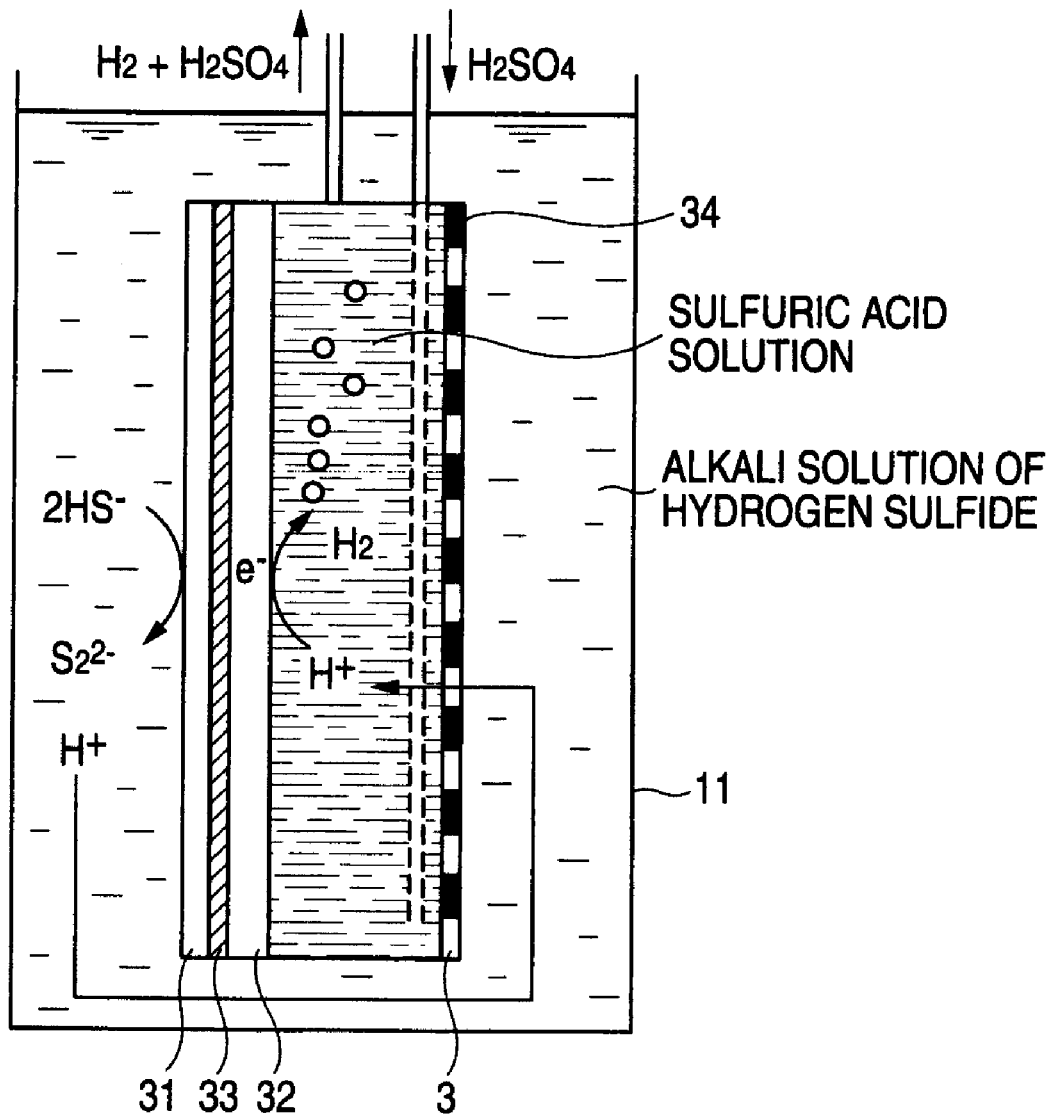
FIG. 6 is a diagrammatic view illustrating the constitution of the apparatus which is another embodiment of the photocatalytic-reaction apparatus of the invention and was used in a photocatalytic reaction in Example 3.

FIG. 6 is a view diagrammatically illustrating another embodiment of the apparatus of the invention for treating hydrogen sulfide and producing hydrogen.

FIG. 1 is a view diagrammatically illustrating a photocatalytic-reaction apparatus constituted so that the cell 11 for electrolysis has been partitioned with a cation-exchange membrane 3 into a first liquid tank having a photocatalyst electrode 1 and a second liquid tank having a metal electrode 2. On the other hand, FIG. 6 is a sectional view diagrammatically illustrating the constitution of a photocatalytic-reaction apparatus which has a second liquid tank in a liquid tank for placing therein a liquid containing hydrogen sulfide.

The photocatalytic-reaction apparatus shown in FIG. 6 comprises an electrolytic cell 11 (first liquid tank) and, disposed in the first tank, a photoelectrochemical cell 34 (second liquid tank) having partition materials. One of the partition materials comprises an electrically conductive plate 33 such as a titanium plate, a photocatalyst layer 31 (photocatalyst electrode 1) formed on the outer side of the plate 33, and a metallic layer 32 (metal electrode 2) formed on the inner side of the plate 33. The other of the partition materials is constituted of a cation-exchange membrane 3.

In order to treat hydrogen sulfide and produce hydrogen using the electrolytic cell 11 having the constitution described above, a liquid containing hydrogen sulfide and other substances is electrolyzed with the photoelectromotive force generated between the photocatalyst electrode 1 (photocatalyst layer 31) and the metal electrode 2 (metallic layer 32).

Hydrogen sulfide ions (HS⁻) present in the aqueous hydrogen sulfide solution in the first liquid tank are decomposed with light energy into hydrogen ions (H⁺) and polysulfide ions ($S_2^{2-}$) on the photocatalyst electrode 1. The electrons which generate upon the decomposition and the hydrogen ions move to the metal electrode 2 in the second liquid tank through the conductive member (electrons) and the cation-exchange membrane (hydrogen ions), and the hydrogen ions are reduced on the metal electrode 2 to generate hydrogen gas.

Reaction formulae for these two steps are as shown above.

Regardless of whether the photocatalytic-reaction apparatus according to the invention is the cation-exchange membrane partition type shown in FIG. 1 or the type containing a photoelectrochemical cell inside as shown in FIG. 6, it is essential that the apparatus should be constituted so that the photocatalyst electrode 1 can be irradiated with a light.

For satisfying it, it is, for example, necessary that a ceiling part of the apparatus (cell 11 for electrolysis or first liquid tank) should be constituted of a light-transmitting (transparent) material (e.g., an acrylic resin) or that wall material of the first liquid tank which faces the photocatalyst electrode 1 (photocatalyst layer 31) be constituted of a light-transmitting (transparent) material, so that the photocatalyst electrode 1 can be exposed to sunlight or illuminated with a light source, e.g., a lamp, from outside the apparatus.

However, this does not apply when a light source (e.g., a lamp) having waterproofness or the like is disposed in the liquid in the first liquid tank. In this case, it is rather preferred that the inner surface of that wall of the cell 11 for electrolysis or first liquid tank which faces the photocatalyst electrode 1 (photocatalyst layer 31) be constituted so as to be a light-reflecting surface (e.g., a mirror surface).

In the photocatalytic-reaction apparatus comprising a first liquid tank and a second liquid tank disposed therein, the second liquid tank (photoelectrochemical cell 34) need not be always disposed vertically as shown in FIG. 6. It may be obliquely disposed so that a device for supplying or circulating an acidic solution is located over the second liquid tank. In this case, however, it is a matter of course that to dispose the tank so that the photocatalyst layer 31 (photocatalyst electrode 1) faces upward is favorable for facilitating the light irradiation of the photocatalyst layer 31. It is also a matter of course that the device for circulating an acidic solution is constituted so that the inlet and outlet of the acidic solution are located on the lower side and upper side, respectively, from the standpoint of ease of the removal of hydrogen generated.

It is preferred that the photocatalytic-reaction apparatus according to the invention should have a device for supplying or circulating an acidic solution to the second liquid tank. The disposition of such a device heightens the hydrogen ion concentration of the liquid in the second liquid tank to further improve the initial reaction efficiency, and is effective in improving the efficiency of hydrogen sulfide removal and the efficiency of hydrogen generation. Furthermore, that device improves the releasability of hydrogen bubbles generated on the metal electrode to enable stable hydrogen generation (reason: in case where the bubbles remain adherent, the reaction surface is covered with such bubbles to make the reduction reaction of hydrogen less apt to occur). In addition, the hydrogen bubbles can be removed from the cell together with the flow of the acidic solution to facilitate hydrogen recovery (reason: in case where the solution is not circulated, the bubbles remain in the cell).

Constituent members forming the apparatus according to the invention will be explained below in detail.

The photocatalyst which is a constituent element of the photocatalyst electrode comprising a photocatalyst to be used in the invention is not particularly limited. However, one comprising a metal sulfide is preferred. The reasons for the preference of one comprising a metal sulfide are that the adsorption of hydrogen sulfide ions ($HS^-$) onto the surface of a metal sulfide lowers a hydrogen generation potential and that when metal element dissolution occurs, the electrode undergoes reduction by $HS^-$ and has a self-repair function and, as a result, an electrode which does not corrode, is stable, and has a long life is realized.

Examples of the metal sulfide include cadmium sulfide or zinc sulfide which each can utilize visible light, e.g., sunlight, as it is in the photocatalytic reaction.

The photocatalyst having any desired shape such as, e.g., a particulate or thin-film shape can be used without any particular limitations.

Preferred particles are the fine particles having a layered nanocapsule structure disclosed in JP-A-2003-265962 and JP-A-2004-25032 because such particles have high catalytic activity.

The catalyst of a thin-film shape preferably is one comprising a base made of silicon, glass, nickel, zinc, platinum, a resin, or the like and a photocatalyst deposited thereon in a thin film form. This is because this photocatalyst not only is convenient for handling but can have a large area using a small catalyst amount and because this photocatalyst is not dispersed in a solution unlike the particulate one but is fixed on the base and, hence, the efficiency of energy conversion of an irradiation light can be improved by optimizing the angle of irradiation.

Furthermore, by fixing fine particles having a layered nanocapsule structure to form an electrode, even higher activity is obtained due to an increase in reaction surface area.

The metal electrode 2, which is a cathode as the counter electrode for the photocatalyst electrode 1 serving as an anode, is not particularly limited. However, a metal having activity in hydrogenation reaction, such as, e.g., platinum or nickel, is preferred. Most preferred is platinum.

In the second liquid tank (photoelectrochemical cell 34) in FIG. 6, the electrically conductive plate 33 on which the photocatalyst layer 31 and the metallic layer 32 are to be formed should be an electrically conductive platy base made of titanium, zirconium, nickel, zinc, platinum, or another material. Of these, a titanium plate is an especially preferred material because it is chemically stable, is tough and lightweight, is in use as a piping material for plants or as aircraft parts, etc., and is easily available.

The cation-exchange membrane is not particularly limited as long as it has selective permeability to hydrogen ions. This cation-exchange membrane prevents the anions, such as $OH^-$ and $SH^-$, dissolved substances, such as $O_2$ and $S_2$, and precipitates which are present in the liquid tank having the photocatalyst electrode 1 from moving to the liquid tank having the metal electrode 2 and enables $H^+$ ions only to selectively move. Thus, the $H^+$ concentration in the metal electrode immersion tank is heightened and this in turn enables hydrogen gas to be generated in a larger amount.

The liquid containing hydrogen sulfide which is to be used as a raw liquid in the method of hydrogen sulfide treatment and method of hydrogen production of the invention includes both of a raw liquid originally containing hydrogen sulfide, such as a hydrogen sulfide-containing wastewater discharged from a sulfuric acid or sulfur compound insecticide manufacturing plant, a hydrogen sulfide-containing wastewater generated in a petroleum desulfurization step, or a hot-spring wastewater, and a raw liquid prepared by bubbling hydrogen sulfide gas into a liquid such as water to dissolve the gas therein in order to treat the hydrogen sulfide gas as a raw material for either of hydrogen and sulfur for use in a field of chemical industry where hydrogen, sulfur, or the like is necessary. It is well known in the art that in the latter case, an alkali agent such as sodium hydroxide is added to make the hydrogen sulfide-containing liquid alkaline in order to enhance the stability of the dissolved hydrogen sulfide gas. By alkalinizing the liquid in the tank having the photocatalyst electrode 1, the hydrogen sulfide ion ($HS^-$) concentration can be heightened and a hydrogen generation potential can be lowered.

In the method of treating hydrogen sulfide and method of generating hydrogen of the invention, the hydrogen sulfide gas generated in a sewage treatment plant or the like can also be treated. In this case, the gas containing hydrogen sulfide generated in a sewage treatment plant or the like contains a large amount of carbon dioxide also. Even when such a gas containing hydrogen sulfide and carbon dioxide is bubbled into an alkaline liquid as in the case described above, the efficiency of hydrogen sulfide absorption/dissolution in the alkaline liquid decreases due to an influence of the carbon dioxide.

For overcoming such problem, the following technique can be used. The gas containing hydrogen sulfide and carbon dioxide is bubbled into an aqueous methyldiethanolamine solution or the like, for example, at ordinary temperature (room temperature). As a result, the hydrogen sulfide can be absorbed/dissolved in the methyldiethanolamine solution, while the carbon dioxide can be discharged without being absorbed/dissolved in the dimethylethanolamine solution. Subsequently, the methyldiethanolamine solution containing hydrogen sulfide absorbed/dissolved therein is heated to a temperature higher than ordinary temperature (e.g., to about 70° C.) and air is bubbled into this solution, whereby the hydrogen sulfide absorbed/dissolved is released from the methyldiethanolamine solution. Thus, hydrogen sulfide gas having a high purity (concentration) containing (almost) no carbon dioxide can be obtained. The high-purity hydrogen sulfide gas obtained may be subjected to the same treatment again or two or more times repeatedly. Thus, the carbon dioxide remaining in a slight amount can be further removed to obtain hydrogen sulfide gas having an even higher purity.

This hydrogen sulfide gas obtained, which contains no carbon dioxide and has a high purity, is bubbled into an alkaline liquid, whereby the "liquid containing hydrogen sulfide" for use in the invention can be obtained.

The treatment step described above in which carbon dioxide is removed from the gas containing hydrogen sulfide and carbon dioxide generated in a sewage treatment plant or the like to obtain high-purity hydrogen sulfide gas is explained in more detail by reference to drawings.

Figure 3:
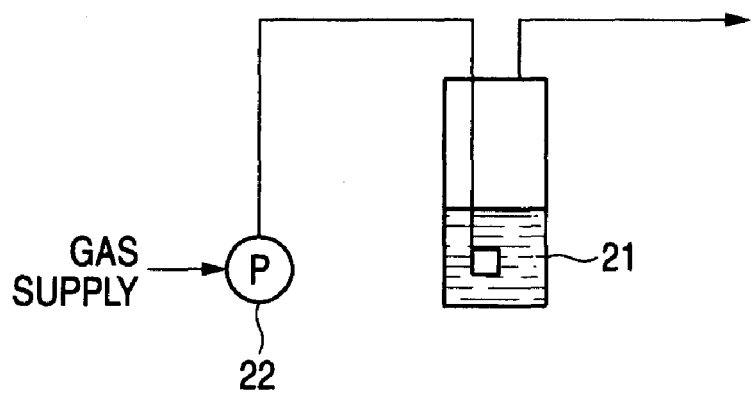
FIG. 3 is a diagrammatic view of devices/utensils for use in, e.g., bubbling a gas containing hydrogen sulfide and carbon dioxide into a methyldiethanolamine solution.

The bubbling of the gas containing hydrogen sulfide and carbon dioxide into a methyldiethanolamine solution can be conducted, for example, with the devices/utensils whose constitution is diagrammatically shown in FIG. 3. The devices/utensils whose constitution is diagrammatically shown in FIG. 3 comprise a washing bottle 21, an air pump 22, and a gas pipe. The methyldiethanolamine solution is placed in the washing bottle 21, and the gas containing hydrogen sulfide and carbon dioxide is supplied/sent with the air pump 22.

Figure 4:
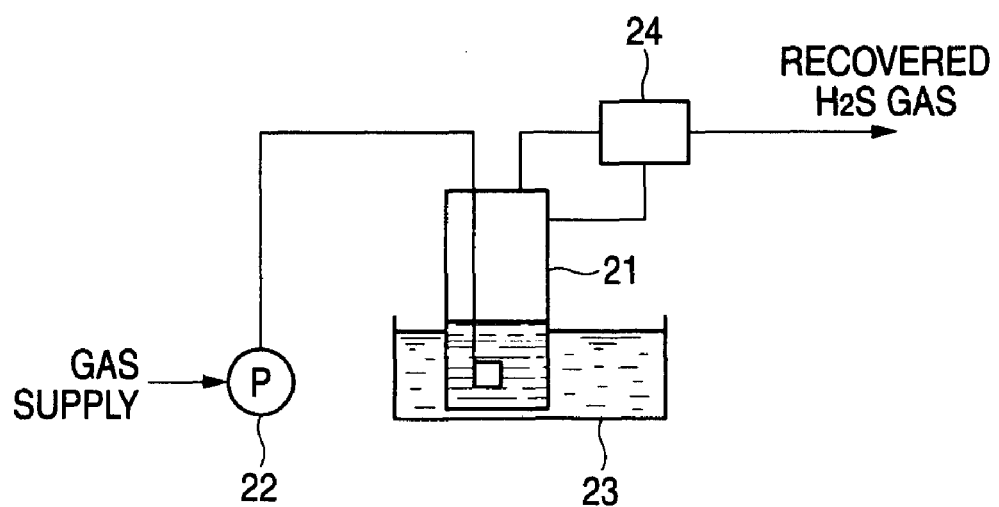
FIG. 4 is a diagrammatic view of devices/utensils for use in causing a methyldiethanolamine solution containing hydrogen sulfide absorbed/dissolved therein to release the hydrogen sulfide.

For releasing the hydrogen sulfide from the methyldiethanolamine solution containing hydrogen sulfide absorbed/dissolved therein, use can be made of, for example, the devices/utensils whose constitution is diagrammatically shown in FIG. 4. The devices/utensils whose constitution is diagrammatically shown in FIG. 4 comprise a heater 23, e.g., a water bath, and a cooler 24, e.g., a mist separator for removing water vapor and the like, besides the devices/utensils shown in FIG. 3. The methyldiethanolamine solution containing hydrogen sulfide absorbed/dissolved therein is heated with the heater 23 and air is supplied/sent thereto with the air pump 22. The air which has been bubbled into the heated methyldiethanolamine solution and discharged therefrom contains hydrogen sulfide and water vapor. This water vapor is removed/separated by the cooler 24.

For bubbling the thus-obtained hydrogen sulfide gas having a high purity and containing no carbon dioxide into an alkaline liquid, use can be made of, for example, the devices/utensils whose constitution is diagrammatically shown in FIG. 3. The alkaline liquid is placed in the washing bottle 21, and the high-purity hydrogen sulfide gas is supplied/sent thereto with the air pump 22. Thus, the "liquid containing hydrogen sulfide" for use in the invention can be obtained.

On the other hand, the liquid to be placed in the liquid tank where the metal electrode 2 as a cathode is immersed need not be always acidic. However, an acidic liquid brings about a better initial reaction efficiency to improve the efficiency of hydrogen sulfide removal and the efficiency of hydrogen generation. Incidentally, even when the liquid to be placed in the liquid tank where the metal electrode 2 as a cathode is immersed is not acidic, the hydrogen ion concentration of the liquid in this tank gradually increases with the progress of reaction and the efficiency of reaction gradually improves.

When the apparatus and raw liquid explained above are used, the methods of the invention, in which hydrogen sulfide is directly decomposed on the photocatalyst electrode with light energy, e.g., sunlight, and hydrogen is produced on the metal electrode with the energy, can be carried out at a high efficiency.

EXAMPLES

The invention will be explained below by reference to Examples, but the invention should not be construed as being limited by the following Examples in any way.

Example 1

The apparatus to be used in the Example will be explained below first, and the procedure of operation thereof will be explained next.

Figure 2:
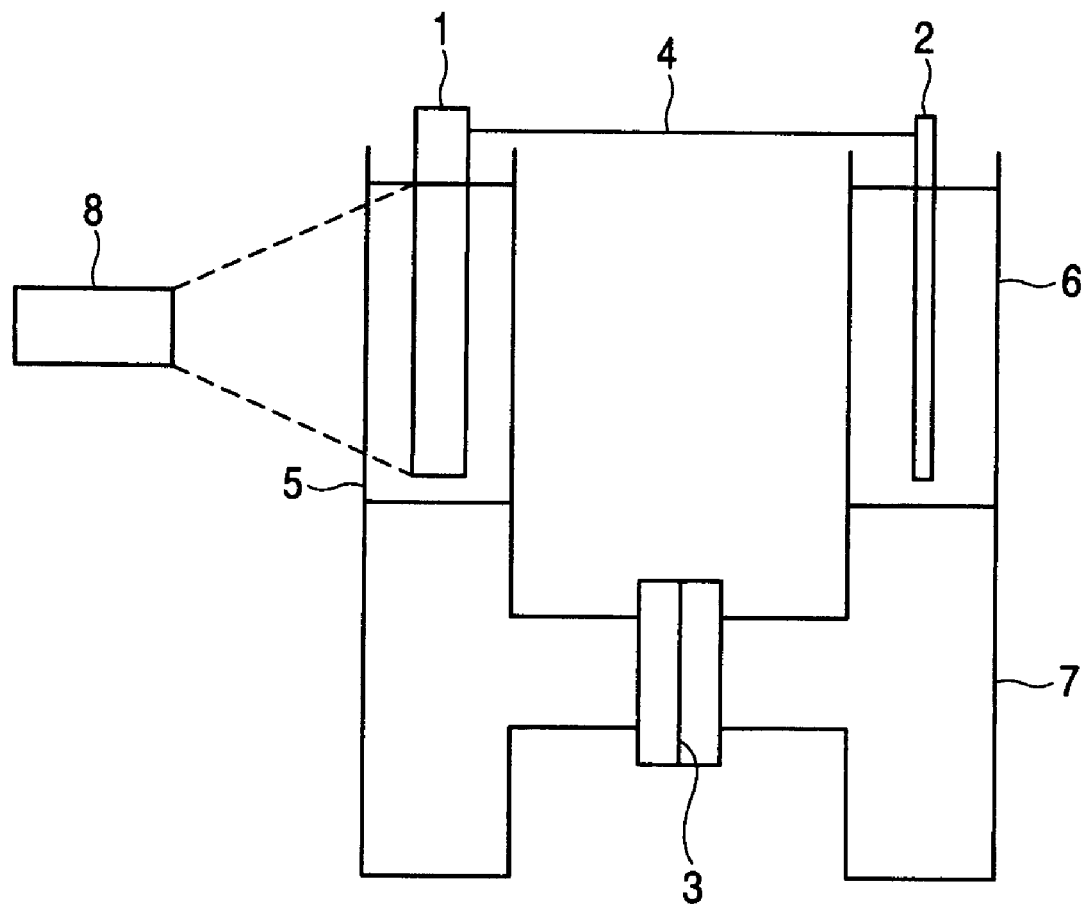
FIG. 2 is a diagrammatic view illustrating the constitution of the apparatus used in Example 1 according to the invention.

An apparatus for making an experiment concerning hydrogen generation by a treatment of hydrogen sulfide with a photocatalyst was used. As shown in FIG. 2, this apparatus comprises a cylindrical pipe 5 which is made of an acrylic resin and is to be filled with 0.1 mol/L sodium sulfide solution for immersing a photocatalyst electrode 1 as an anode, a cylindrical pipe 6 which is made of a transparent vinyl chloride resin and is to be filled with 0.1 mol/L sulfuric acid solution for immersing a metal electrode 2 as a cathode, and an H-shaped rigid-PVC pipe 7 which is a connecting pipe for the two electrode vessels and has been partitioned at the center of the bridge with a cation-exchange membrane 3. The bottoms of the respective electrode vessels are connected to each other with the pipe 7, and these members have been united together. Numeral 8 denotes a xenon lamp for light irradiation and 4 denotes a lead wire which electrically connects the photocatalyst electrode 1 to the metal electrode 2.

The photocatalyst electrode to be used was produced by fixing cadmium sulfide to an electrically conductive ITO glass by the method disclosed in JP-A-2003-181297. It was used in a size of 80 mm×15 mm in terms of electrode area.

On the other hand, a platinum rod was used as the metal electrode. The electrode size was 4 mmϕ×80 mm.

A copper wire was used as the lead wire 4 connecting the photocatalyst electrode 1 to the metal electrode 2. Crocodile clips were used for the electrical connection between the two electrodes 1 and 2.

The material of the light-receiving part of the photocatalyst electrode 1 was a transparent acrylic resin, and the other parts of the vessels were produced from a transparent vinyl chloride resin and a rigid vinyl chloride resin.

The photocatalyst electrode 1 vessel and the metal electrode 2 vessel each had a capacity of 60 mL.

The apparatus having the constitution explained above was used. A voltage was applied between the two electrodes and the photocatalyst electrode 1 was irradiated with xenon light from a xenon lamp. As a result, that the hydrogen generation amount increased almost in proportion to the irradiation time was ascertained from a visual examination for bubble generation.

Incidentally, the use of the xenon lamp as a light source was intended to enable the experiment to proceed quantitatively. It is a matter of course that sunlight is practically usable as a light source.

Example 2

The following experiment was conducted on the assumption that a gas containing hydrogen sulfide and carbon dioxide and generated from a sewage treatment plant or the like was treated.

First, a gas containing a large amount of carbon dioxide was subjected to a hydrogen sulfide gas separation step to separate hydrogen sulfide gas from that gas. The hydrogen sulfide gas obtained was subjected to a hydrogen sulfide gas dissolution step to cause the gas to be absorbed in an alkaline liquid to obtain a hydrogen sulfide solution. This hydrogen sulfide solution was subjected to a photocatalytic reaction step to decompose the hydrogen sulfide with a photocatalyst and thereby generate hydrogen.

Two hundred liters of a gas mixture containing 200 ppm hydrogen sulfide and 32% carbon dioxide was supplied to a gas washing bottle with an air pump 22, as shown in FIG. 3, at a flow rate of 1 L/min to cause the hydrogen sulfide to be absorbed in 200 mL of 45 wt % methyldiethanolamine solution in the gas washing bottle 21. The carbon dioxide is discharged from the washing bottle almost without being absorbed in the methyldiethanolamine solution.

As shown in FIG. 4, the washing bottle 21 containing the liquid in which hydrogen sulfide had been absorbed was heated with a 70° C. hot water (water bath; heater 23), and air was supplied to the gas washing bottle with an air pump 22 at a flow rate of 3.7 L/min to conduct aeration. The gas absorbed in the absorbing liquid was thus released and recovered.

The amount of the gas recovered was 170 L, and the hydrogen sulfide concentration and the carbon dioxide concentration were 176 ppm and 0.9%, respectively.

The gas recovered was supplied again to a gas washing bottle 21 with an air pump, as shown in FIG. 3, at a flow rate of 1 L/min to cause the hydrogen sulfide to be absorbed in 200 mL of 45 wt % methyldiethanolamine solution in the gas washing bottle 21. Thereafter, as shown in FIG. 4, the washing bottle 21 containing the liquid in which hydrogen sulfide had been adsorbed was heated with 70° C. hot water, and air was supplied to the gas washing bottle 21 with an air pump 22 at a flow rate of 3.7 L/min to conduct aeration. The gas absorbed in the absorbing liquid was thus released.

The amount of the gas recovered by that operation was 170 L, and the hydrogen sulfide concentration and the carbon dioxide concentration were 155 ppm and 0.07%, respectively.

The gas obtained in the hydrogen sulfide gas separation step was sent to a washing bottle 21 with an air pump 22 as shown in FIG. 3 to dissolve the gas in 200 mL of 0.1 mol/L sodium hydroxide solution in the washing bottle.

The gas obtained by the hydrogen sulfide gas separation step conducted 18 times in total was caused to be absorbed in the sodium hydroxide solution to obtain 200 mL of 0.09 mol/L hydrogen sulfide solution.

Figure 5:
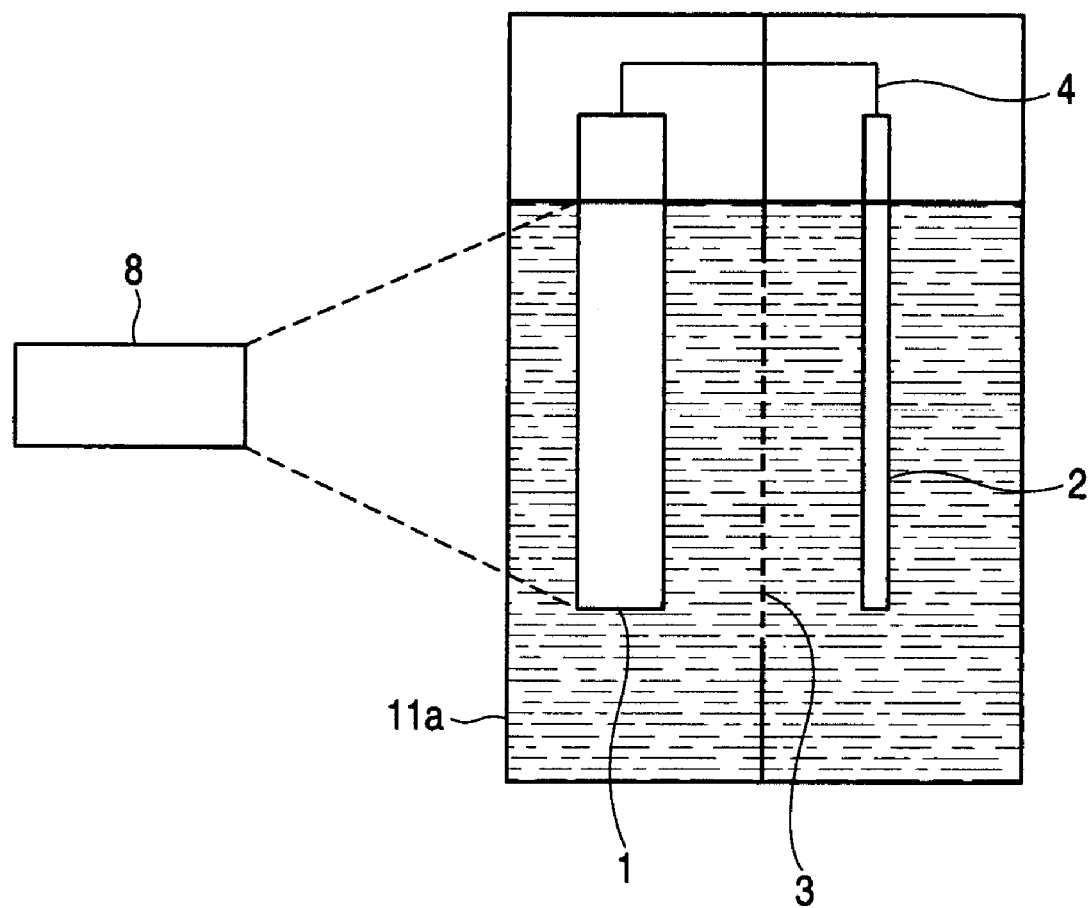
FIG. 5 is a diagrammatic view illustrating the constitution of the apparatus used for a photocatalytic reaction in Example 2 according to the invention.

A sealed cell 11a for electrolysis such as that shown in FIG. 5 was used as an apparatus for conducting an experiment concerning hydrogen generation by a treatment of hydrogen sulfide with a photocatalyst. In this apparatus, the anode side and the cathode side had been separated from each other by a cation-exchange membrane 3. The anode side was filled with the 0.09 mol/L hydrogen sulfide solution produced in the hydrogen sulfide dissolution step, and a photocatalyst electrode 1 was immersed therein. The cathode side was filled with 0.10 mol/L sulfuric acid solution and a metal electrode 2 was immersed therein.

Numeral 8 denotes a xenon lamp for light irradiation and 4 denotes a lead wire which electrically connects the photocatalyst electrode 1 to the metal electrode 2.

The photocatalyst electrode 1 was produced by fixing cadmium sulfide to a titanium plate by the method disclosed in JP-A-2003-181297. This electrode was formed in a size of 100 mm×100 mm in terms of electrode area.

On the other hand, an electrode obtained by coating a titanium net with platinum was used as the metal electrode 2. This electrode had a size of 80 mm×120 mm.

A copper wire was used as the lead wire 4 to electrically connect the photocatalyst electrode 1 to the metal electrode 2.

The vessel part of the cell 11a for electrolysis (photocatalytic-reaction cell) was produced using an acrylic resin.

The photocatalyst electrode 1 vessel and the metal electrode 2 vessel each had a capacity of 200 mL.

The apparatus having the constitution explained above was used and the photocatalyst electrode 1 was irradiated with xenon light emitted from the xenon lamp. As a result, the hydrogen generation amount increased almost in proportion to the irradiation time. At 10 minutes after initiation of the irradiation, a measurement of the amount of hydrogen generated was initiated. The amount of hydrogen generated in the period from the measurement initiation to 1 hour thereafter was 10.7 mL.

Incidentally, the use of the xenon lamp 8 as a light source was intended to enable the experiment to proceed quantitatively. It is a matter of course that sunlight is practically usable as a light source.

Example 3

A second embodiment apparatus was used for conducting an experiment concerning hydrogen generation by a treatment of hydrogen sulfide with a photocatalyst. As shown in FIG. 6, this apparatus comprised: a cell 11 for electrolysis, as a first liquid tank, which contained a raw liquid prepared by dissolving hydrogen sulfide in an aqueous sodium hydroxide solution so as to result in an $HS^-$ concentration of 0.1 M and an $OH^-$ concentration of 1 M; and a photoelectrochemical cell 34, as a second liquid tank, which had been disposed so as to be immersed in the cell 11.

This photoelectrochemical cell 34 had partition materials, one of which comprised: a titanium plate as an electrically conductive base 33; cadmium sulfide fixed as a photocatalyst 31 to the outer side of the titanium plate by the method disclosed in JP-A-2003-181297 to thereby form a photocatalyst electrode 1 having an electrode size of 100 mm×100 mm; and platinum, as a metallic layer 32, deposited on the inner side, i.e., the side opposite to the photocatalyst layer, of the titanium base by electroplating to form a metal electrode 2.

The other of the partition materials, which was disposed on the opposite side, was constituted of a cation-exchange membrane 3. Thus, the photoelectrochemical cell 34 was constituted as a sealed cell. An acrylic resin pipe for supplying/circulating sulfuric acid having a concentration of 0.5 M as an acidic solution was attached to an upper part of the cell 34.

The cell 11 for electrolysis, as a first liquid tank, was constituted of a transparent acrylic resin material. The cell 11 for electrolysis was irradiated from the outside with a light using a xenon lamp for light irradiation (not shown) so that the photocatalyst layer 31 had a light irradiation area of 15.9 cm$^2$ and a light irradiation intensity of 15.1 W.

The cell 11 for electrolysis had a capacity of 1,750 mL and the photoelectrochemical cell 34 had a capacity of 175 mL.

Figure 7:
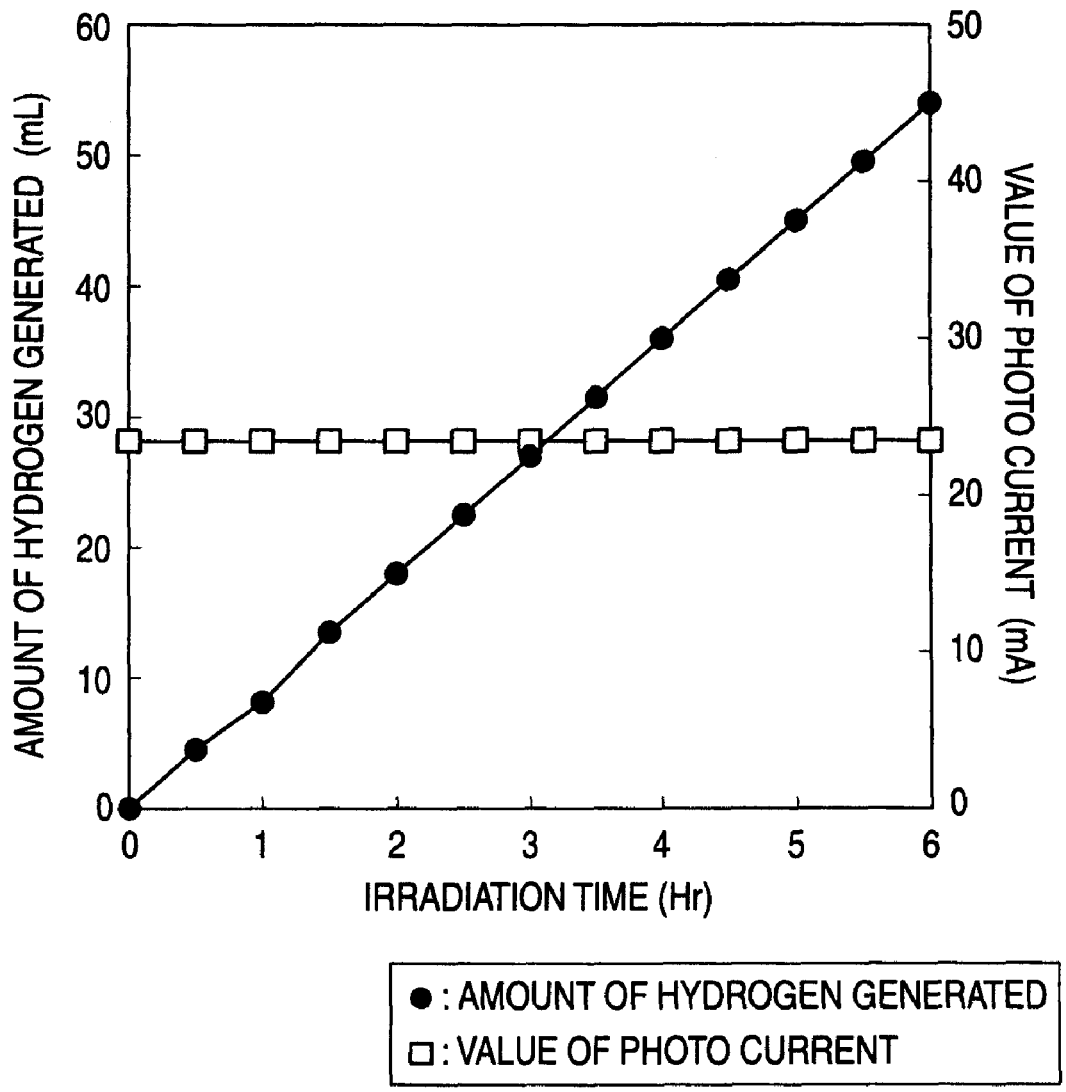
FIG. 7 is a graphic presentation showing the relationship between reaction time and each of the amount of hydrogen generated and the value of interelectrode photo current in the photocatalytic reaction in Example 3.

The apparatus having the constitution explained about was used and the photocatalyst layer 31 was irradiated with xenon light emitted from the xenon lamp. As a result, the hydrogen generation amount increased almost in proportion to the irradiation time as shown in FIG. 7. At 30 minutes after initiation of the light irradiation, a measurement of the amount of hydrogen generated was initiated. The amount of hydrogen generated in the period from the measurement initiation to 6 hours thereafter was 53.1 mL.

Furthermore, the value of photo current between the photocatalyst (CdS) layer 31 (photocatalyst electrode 1) and the metallic (Pt) layer 32 (metal electrode 2) during the photocatalytic reaction (light irradiation) was almost constant at 23 mA. It can be seen that the photocatalytic reaction, hydrogen sulfide treatment, and hydrogen production were stably conducted.

Incidentally, the use of the xenon lamp (not shown in the figure) was intended to enable the experiment to proceed quantitatively. It is a matter of course that sunlight is practically usable as a light source.

INDUSTRIAL APPLICABILITY

The method of treating hydrogen sulfide, method of producing hydrogen, and photocatalytic-reaction apparatus of the invention have exceedingly hopeful applications in chemical industries such as the step of ammonia or methanol production which necessitates hydrogen and the sulfuric acid or insecticide production industry where sulfur is necessary and in the field of chemical industry in which natural gas, various industrial gases, and petroleum are produced or treated and hydrogen sulfide or the like generated in a desulfurization or another step is treated.

The invention claimed is:

1. A method of treating hydrogen sulfide, which comprises disposing a first liquid tank having a photocatalyst electrode comprising a photocatalyst and a second liquid tank having a metal electrode so that the two liquid tanks are separated from each other by a cation-exchange membrane, placing a liquid containing hydrogen sulfide in the first liquid tank having a photocatalyst electrode, placing a liquid in the second liquid tank having a metal electrode, electrically connecting the photocatalyst electrode to the metal electrode in the second liquid tank, and exposing the photocatalyst to a light wherein the liquid in the second liquid tank having a metal electrode is an acidic solution.

2. The method of treating hydrogen sulfide according to claim 1, wherein the photocatalyst comprises a metal sulfide.

3. The method of treating hydrogen sulfide of claim 1, wherein the photocatalyst is fine particles having a layered nanocapsule structure.

4. The method of treating hydrogen sulfide according to claim 1, wherein the liquid containing hydrogen sulfide is one obtained by bubbling hydrogen sulfide gas into an alkaline liquid to dissolve the gas in the liquid.

5. The method of treating hydrogen sulfide according to claim 4, wherein the hydrogen sulfide gas is one obtained by bubbling a gas containing hydrogen sulfide and carbon dioxide into a methyldiethanolamine solution, subsequently heating this methyldiethanolamine solution to a temperature higher than room temperature, and bubbling air into the heated methyldiethanolamine solution to cause the solution to release the hydrogen sulfide.

6. A method of producing hydrogen, which comprises disposing a first liquid tank having a photocatalyst electrode comprising a photocatalyst and a second liquid tank having a metal electrode so that the two liquid tanks are separated from each other by a cation-exchange membrane, placing a liquid containing either hydrogen sulfide or an organic substance in the first liquid tank having a photocatalyst electrode, placing a liquid in the second liquid tank having a metal electrode, electrically connecting the photocatalyst electrode to the metal electrode, and exposing the photocatalyst to a light, wherein the liquid in the second liquid tank having a metal electrode is an acidic solution.

7. The method of producing hydrogen according to claim 6, wherein the photocatalyst comprises a metal sulfide.

8. The method of producing hydrogen according to claim 6, wherein the photocatalyst is fine particles having a layered nanocapsule structure.

9. The method of producing hydrogen according to claim 6, wherein the liquid containing hydrogen sulfide is one obtained by bubbling hydrogen sulfide gas into an alkaline liquid to dissolve the gas in the liquid.

10. The method of producing hydrogen according to claim 9, wherein the hydrogen sulfide gas is one obtained by bubbling a gas containing hydrogen sulfide and carbon dioxide into a methyldiethanolamine solution, subsequently heating this methyldiethanolamine solution to a temperature higher than room temperature, and bubbling air into the heated methyldiethanolamine solution to cause the solution to release the hydrogen sulfide.

* * * * *